US006728475B2

United States Patent

(12) United States Patent
Setoguchi et al.

(10) Patent No.: US 6,728,475 B2
(45) Date of Patent: Apr. 27, 2004

(54) DIGITAL MOTION PICTURE DECODING APPARATUS AND DIGITAL MOTION PICTURE DECODING METHOD

(75) Inventors: Nobuo Setoguchi, Nagaokakyoushi (JP); Akihiro Watabe, Udagun (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 88 days.

(21) Appl. No.: 10/028,695

(22) Filed: Dec. 28, 2001

(65) Prior Publication Data

US 2002/0080879 A1 Jun. 27, 2002

Related U.S. Application Data

(63) Continuation of application No. 08/961,988, filed on Oct. 31, 1997, now Pat. No. 6,393,204.

(30) Foreign Application Priority Data

Oct. 31, 1996 (JP) ............................................ 8-289521

(51) Int. Cl.[7] ................................................ H04N 5/91

(52) U.S. Cl. ....................................... 386/111; 386/112

(58) Field of Search ............................. 386/46, 68, 95, 386/98, 111, 112, 124, 131, 125, 83, 65; 348/564

(56) References Cited

U.S. PATENT DOCUMENTS

| | | | | |
|---|---|---|---|---|
| 5,212,549 A | | 5/1993 | Ng et al. | 375/240.15 |
| 5,371,602 A | | 12/1994 | Tsuboi et al. | 386/111 |
| 5,502,573 A | * | 3/1996 | Fujinami | 386/65 |
| 5,532,835 A | | 7/1996 | Nakagaki et al. | 386/79 |
| 5,784,518 A | * | 7/1998 | Ogura | 386/68 |
| 5,799,129 A | | 8/1998 | Muto | 386/111 |
| 5,877,817 A | * | 3/1999 | Moon | 348/564 |
| 5,949,948 A | | 9/1999 | Krause et al. | 386/6 |
| 5,970,205 A | | 10/1999 | Nakamura et al. | 386/68 |
| 5,991,503 A | * | 11/1999 | Miyasaka et al. | 386/111 |

FOREIGN PATENT DOCUMENTS

| | | | |
|---|---|---|---|
| JP | 63287278 A | | 11/1988 |
| JP | 401218274 A | * | 8/1999 |

* cited by examiner

*Primary Examiner*—Huy Nguyen
(74) *Attorney, Agent, or Firm*—McDermott, Will & Emery

(57) ABSTRACT

A digital motion picture decoding apparatus comprising an input buffer memory for storing coded data to be decoded, a reproduced picture memory for storing the decoded picture data to be displayed, and a display picture deciding means for deciding a reproduced picture to be output from the picture data stored in the reproduced picture memory, further comprises: a program changing means for changing the type of the coded data to be decoded; a program change detecting means for detecting from the output of the program changing means that the type of the coded data to be decoded is changed; and a display state maintaining means for controlling the picture data output from the reproduced picture memory so as to maintain the display state of the reproduced picture which is currently displayed according to the decision of the display picture deciding means, when it is detected from the output of the program change detecting means that the change of the type of the coded data to be decoded makes the coded data not continuous in time sequence.

14 Claims, 10 Drawing Sheets

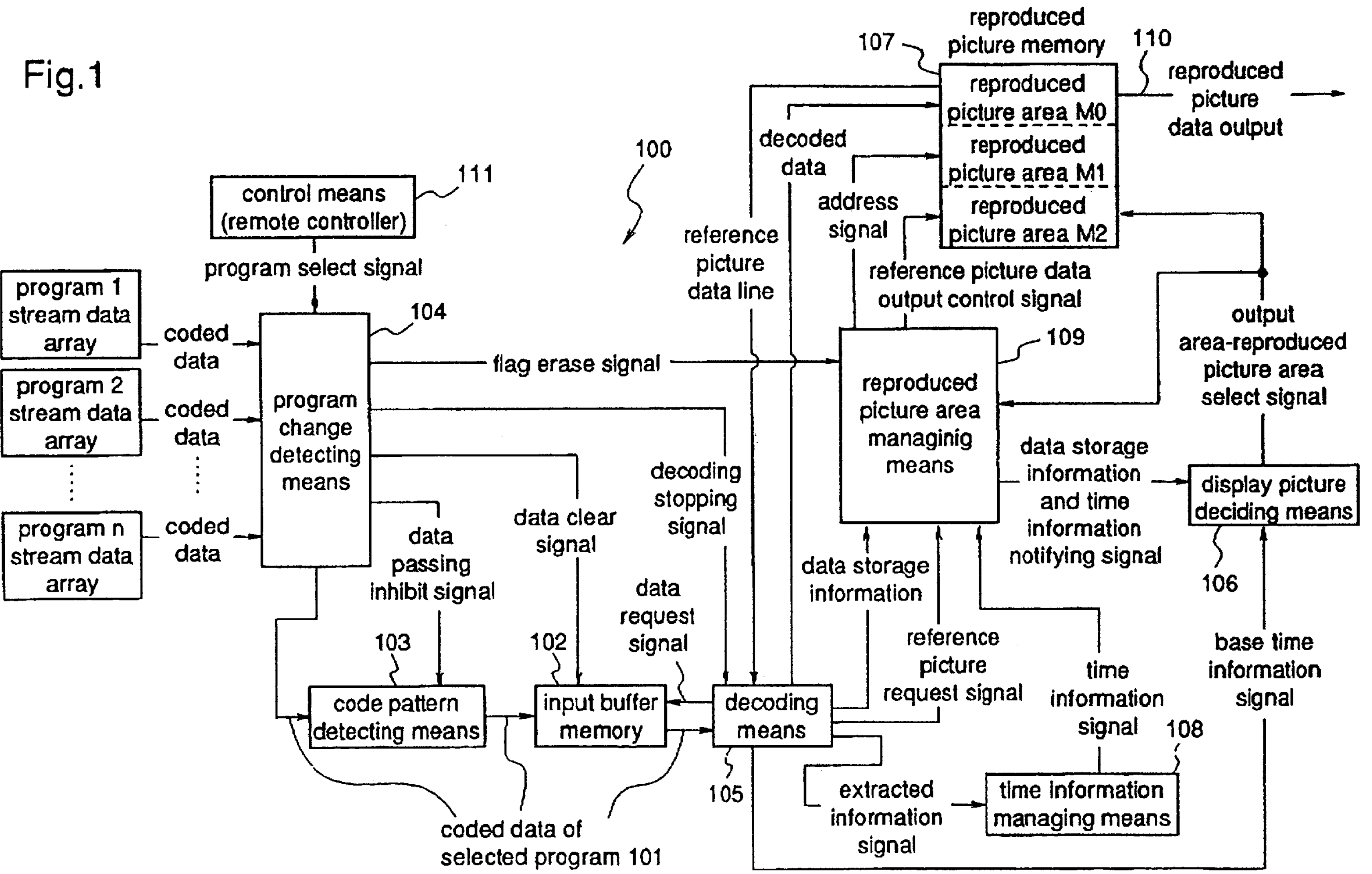
Fig.1
100
program 1 stream data array
program 2 stream data array
program n stream data array
coded data
coded data
coded data
control means (remote controller)
111
program select signal
104
program change detecting means
flag erase signal
data clear signal
data passing inhibit signal
decoding stopping signal
103
code pattern detecting means
coded data of selected program 101
102
input buffer memory
data request signal
105
decoding means
reference picture data line
decoded data
address signal
reference picture data output control signal
107
reproduced picture memory
reproduced picture area M0
reproduced picture area M1
reproduced picture area M2
110
reproduced picture data output
109
reproduced picture area managinig means
data storage information
reference picture request signal
extracted information signal
108
time information managing means
time information signal
data storage information and time information notifying signal
output area-reproduced picture area select signal
106
display picture deciding means
base time information signal

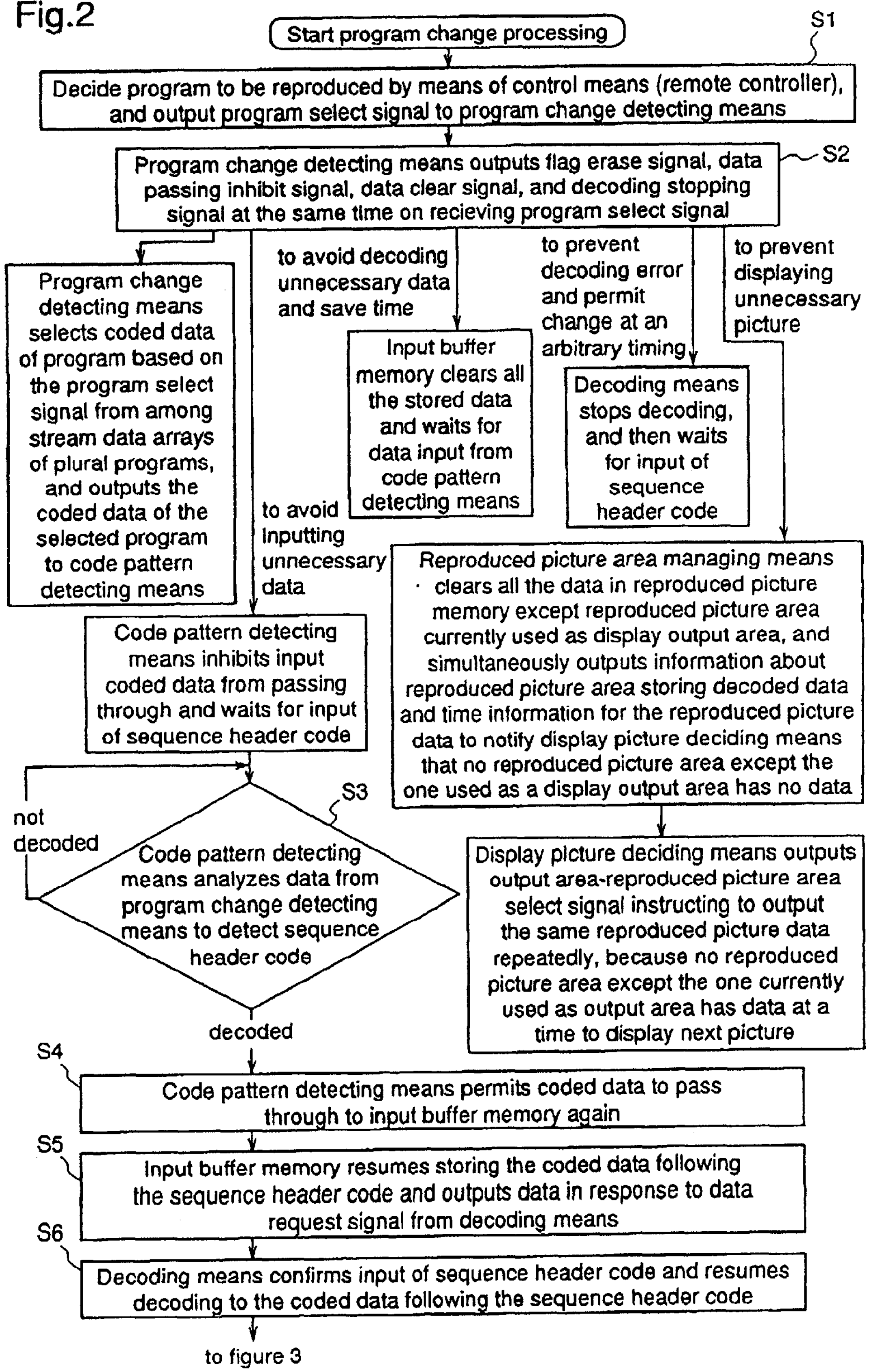
Fig.2
Start program change processing
S1
Decide program to be reproduced by means of control means (remote controller), and output program select signal to program change detecting means
S2
Program change detecting means outputs flag erase signal, data passing inhibit signal, data clear signal, and decoding stopping signal at the same time on recieving program select signal
Program change detecting means selects coded data of program based on the program select signal from among stream data arrays of plural programs, and outputs the coded data of the selected program to code pattern detecting means
to avoid decoding unnecessary data and save time
Input buffer memory clears all the stored data and waits for data input from code pattern detecting means
to prevent decoding error and permit change at an arbitrary timing
Decoding means stops decoding, and then waits for input of sequence header code
to prevent displaying unnecessary picture
to avoid inputting unnecessary data
Reproduced picture area managing means clears all the data in reproduced picture memory except reproduced picture area currently used as display output area, and simultaneously outputs information about reproduced picture area storing decoded data and time information for the reproduced picture data to notify display picture deciding means that no reproduced picture area except the one used as a display output area has no data
Code pattern detecting means inhibits input coded data from passing through and waits for input of sequence header code
not decoded
S3
Code pattern detecting means analyzes data from program change detecting means to detect sequence header code
Display picture deciding means outputs output area-reproduced picture area select signal instructing to output the same reproduced picture data repeatedly, because no reproduced picture area except the one currently used as output area has data at a time to display next picture
decoded
S4
Code pattern detecting means permits coded data to pass through to input buffer memory again
S5
Input buffer memory resumes storing the coded data following the sequence header code and outputs data in response to data request signal from decoding means
S6
Decoding means confirms input of sequence header code and resumes decoding to the coded data following the sequence header code
to figure 3

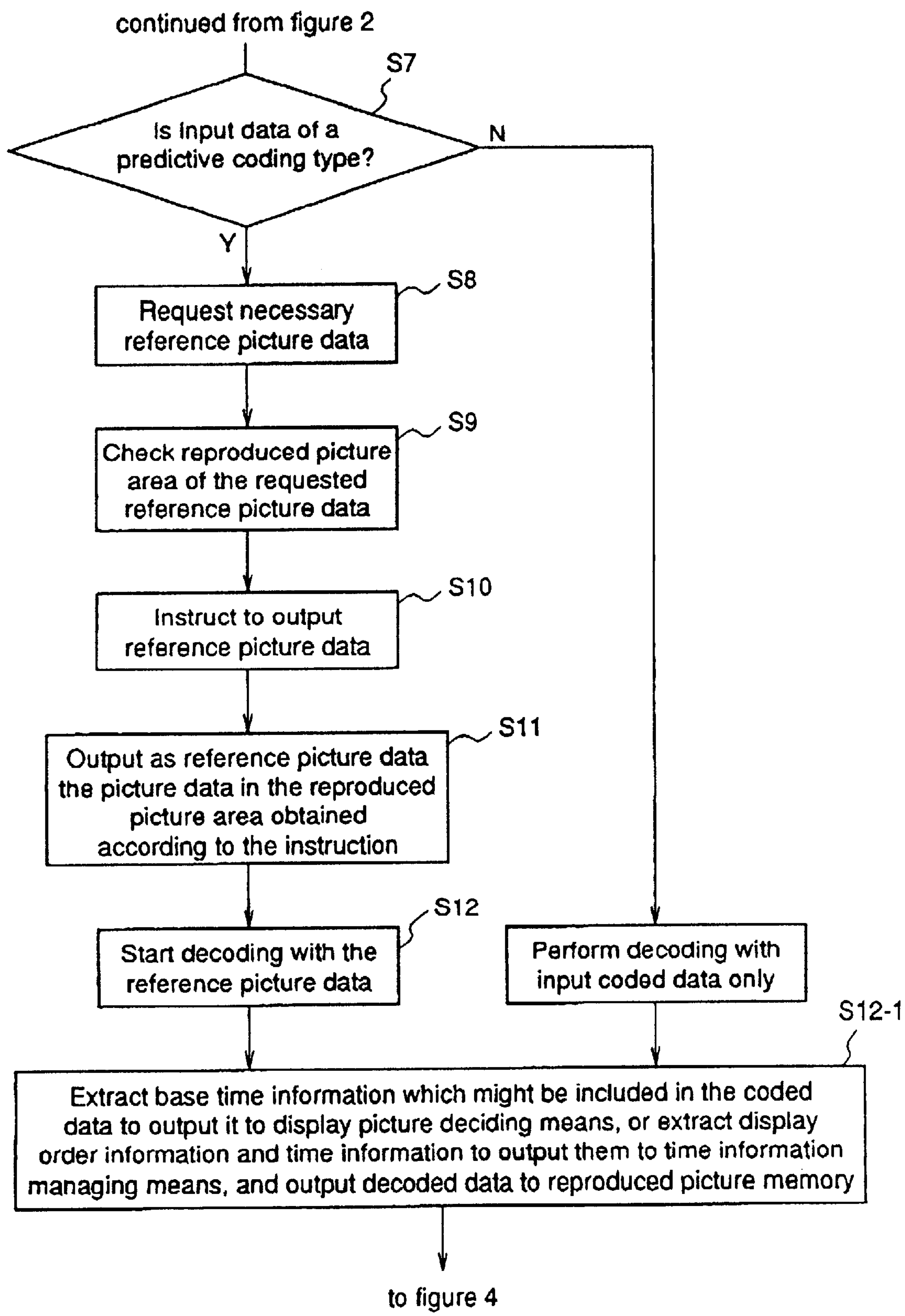
Fig.3
continued from figure 2
S7
Is input data of a predictive coding type?
N
Y
S8
Request necessary reference picture data
S9
Check reproduced picture area of the requested reference picture data
S10
Instruct to output reference picture data
S11
Output as reference picture data the picture data in the reproduced picture area obtained according to the instruction
S12
Start decoding with the reference picture data
Perform decoding with input coded data only
S12-1
Extract base time information which might be included in the coded data to output it to display picture deciding means, or extract display order information and time information to output them to time information managing means, and output decoded data to reproduced picture memory
to figure 4

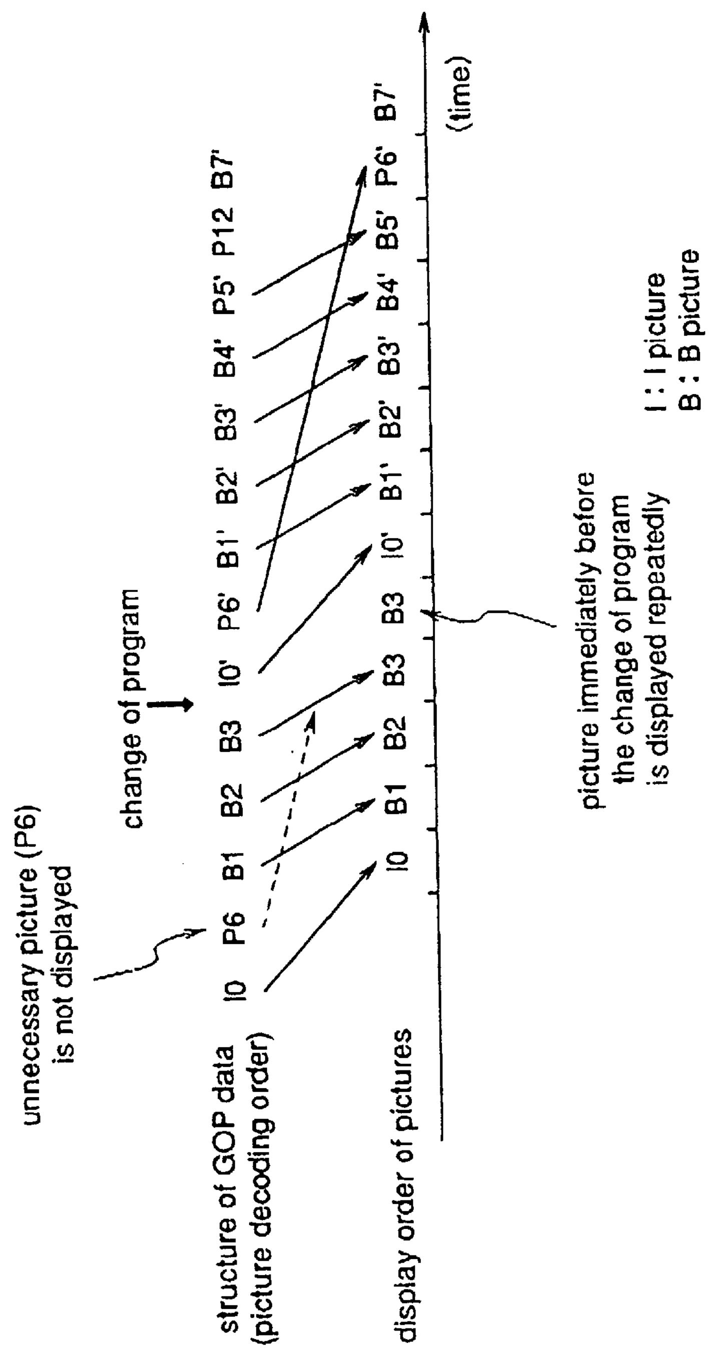

Fig.7
unnecessary picture (P6) is not displayed
change of program
structure of GOP data (picture decoding order)
I0 P6 B1 B2 B3 I0' P6' B1' B2' B3' B4' P5' P12 B7'
display order of pictures
I0 B1 B2 B3 B3 I0' B1' B2' B3' B4' B5' P6' B7'
(time)
picture immediately before the change of program is displayed repeatedly
I : I picture
B : B picture
P : P picture
· numerals such as I0 and P6 indicate display order of corresponding pictures before the change
· numerals such as I0' and P6' indicate display order of corresponding pictures after the change Fig.8 (a)
input coded data
program is changed in the middle of decoding picture B3
I0 | P6 | B1 | B2 | B3
I0' | P6' | B1' | B2' | B3' | B4' | B5' | P12' | B7' | B8' | B9' | .........
Fig.8 (b)
diagram illustrating a state of a data array which causes misconception in the conventional case
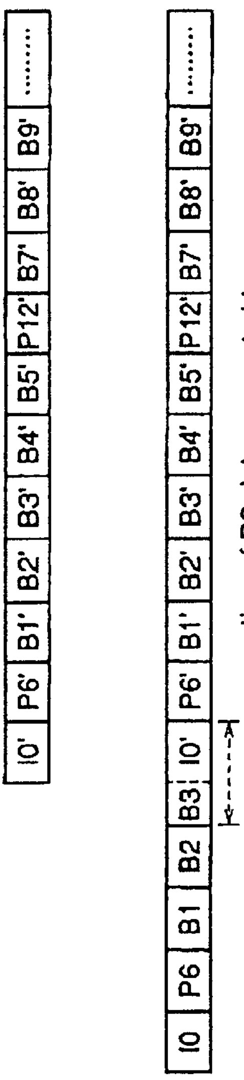
Fig.8 (c)
diagram illustrating a state of a data array which is recognized correctly
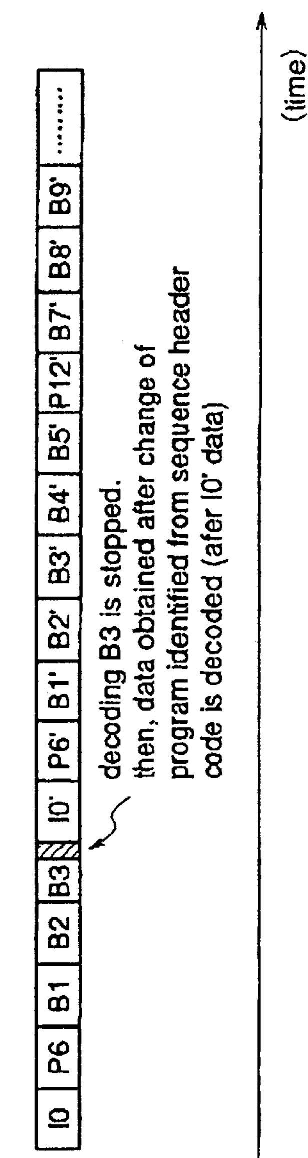

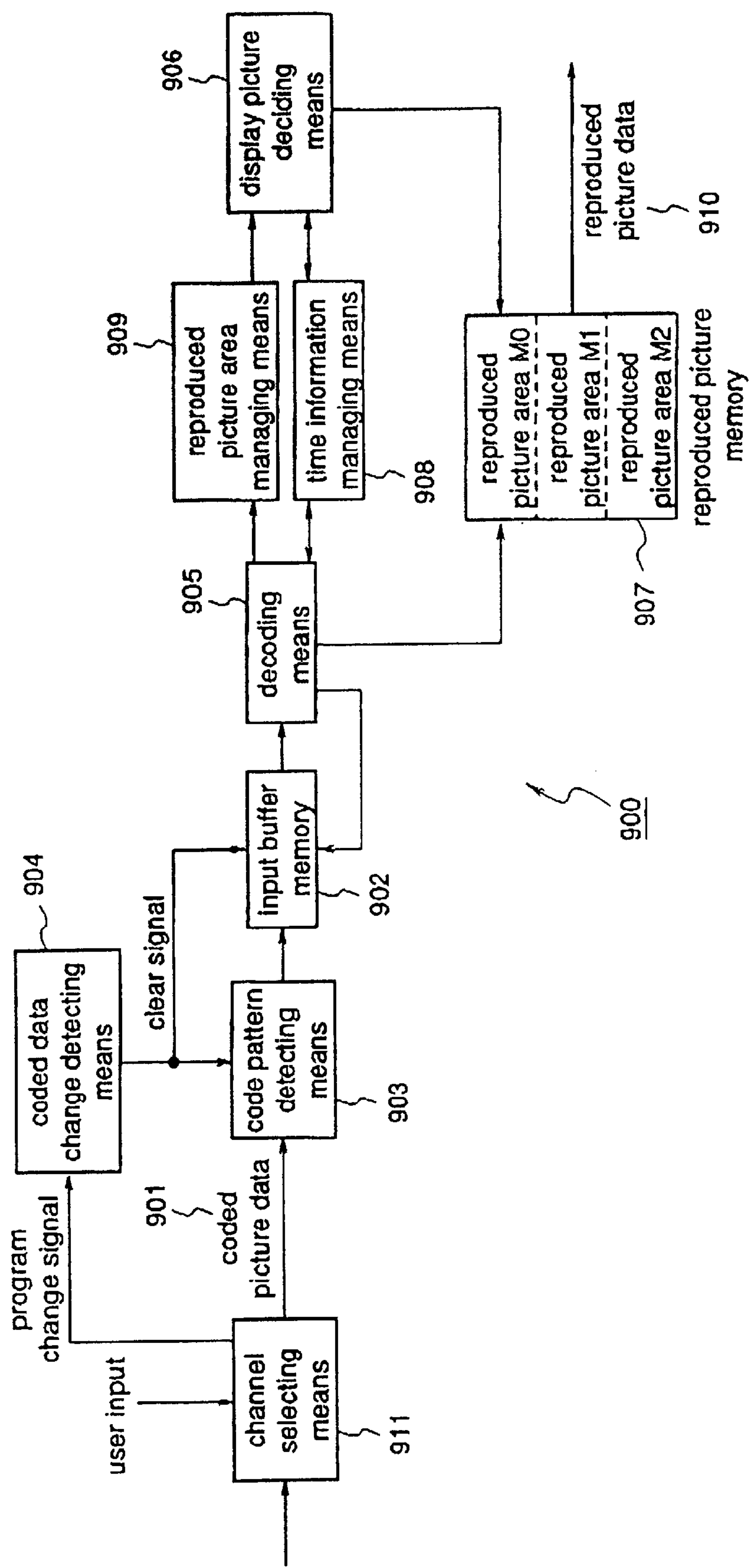

Fig.9 Prior Art
user input
channel selecting means
911
program change signal
coded picture data
901
coded data change detecting means
904
clear signal
code pattern detecting means
903
input buffer memory
902
decoding means
905
reproduced picture area managing means
909
time information managing means
908
display picture deciding means
906
reproduced picture area M0
reproduced picture area M1
reproduced picture area M2
reproduced picture memory
907
reproduced picture data
910
900

Fig.10

| | reproduced picture area M0 | reproduced picture area M1 | reproduced picture area M2 |
|---|---|---|---|
| data storage information | having data | having data | having no data |
| time information | time information | time information | no time information |
| area display information | already displayed | now displayed | not displayed |

data storage information : information indicating which reproduced picture area stores decoded data time information : information indicating a time to display stored decoded data area display information : display information indicating the reproduced picture area from which data is output and now displayed

DIGITAL MOTION PICTURE DECODING APPARATUS AND DIGITAL MOTION PICTURE DECODING METHOD

This is a continuation of application Ser. No. 08/961,988 filed Oct. 31, 1997, U.S. Pat. No. 6,393,204.

FIELD OF THE INVENTION

The invention relates to a digital motion picture decoding apparatus and a digital motion picture decoding method for decoding picture data coded by variable length coding for digital storage media, broadcasting, and communication. In particular, it relates to a digital motion picture decoding apparatus and a digital motion picture decoding method capable of correctly decoding and reproducing coded data which is partially discontinuous due to change of program during the reproduction.

BACKGROUND OF THE INVENTION

Nowadays, demands for general method for coding motion picture and its attached sound are increasing for various applications including digital storage media, or television broadcasting and communication. Motion Picture Experts Group (MPEG) in the International Electrotechnical Commission (IEC) of International Standardization Organization (ISO) has proceeded international standardization of motion picture coding method and already standardized several methods including ISO/IEC 13818-2 (MPEG2video).

Here a description is given, with reference to FIG. 9, of a conventional digital motion picture decoding apparatus for decoding the data coded by the MPEG coding method which is disclosed by Japanese Published Patent Application Number H8-32927, for example.

Reference numeral 900 designates a conventional digital motion picture decoding apparatus, numeral 911 designates a channel selecting means which takes coded video streams corresponding to plural programs as inputs and, in response to a program select signal input by a user, selects a bit stream corresponding to one of the plural programs to output the bit stream as coded picture data 901. This means is also configured to output a program change signal at the same time. The output coded picture data 901 passes through a code pattern detecting means 903 which is described later and is sequentially stored in an input buffer memory 902.

The code pattern detecting means 903 is a block which inhibits data from passing through to the input buffer memory 902 until a prescribed code pattern, I picture (intra-coded picture) of GOP (Group of pictures), is detected based on a change detection signal from the coded data change detecting means 904, and this means normally allows the data to pass through during the reproduction processing.

Reference numeral 905 designates a decoding means which makes a request for data to the input buffer memory 902, where the data obtained is subjected to decoding processing and then successively stored into a predetermined reproduced picture area in a reproduced picture memory 907.

A display picture deciding means 906 decides a reproduced picture to be displayed according to time information of each reproduced picture and the information about the data stored in the reproduced picture memory 907 obtained from a time information managing means 908 and a reproduced picture area managing means 909, outputting the picture as a reproduced picture data 910 for reproduction and display.

Next, a description is given of the operation for a transition from normal reproduction mode to special reproduction mode in which reproduction speed is changed to realize high-speed reproduction.

In response to a request for high-speed reproduction from a user, the coded picture data 901 is transmitted to the code pattern detecting means 903 in a format which comprises only an intra-frame coded picture (I picture) extracted from the bit stream recorded in record medium, and by detecting a pattern of contiguous I pictures, it is detected that the transition to special reproduction mode has been completed. Following this, sending data through to the input buffer memory 902 is stopped and a clear signal is output from the code pattern detecting means 903 to the input buffer memory 902, whereby the data stored in the input buffer memory 902 is erased.

When the code pattern detecting means 903 detects normal pattern again, cancel of the special reproduction mode is recognized and a blue-back processing which is described later is canceled, whereby sending data to the input buffer memory 902 is resumed.

Next, a description is given of the operation in the above-described configuration when the coded data in the process of reproduction becomes partially discontinuous due to change of program.

After detecting based on a program change detection signal that change of the coded data to be input has been performed, the coded data change detecting means 904 sends a clear signal to the input buffer memory 902 to clear all the data stored in the memory 902, while sending a data passing inhibit signal to the code pattern detecting means 903 in order to inhibit data from passing through to the input buffer memory 902 until a start code (I picture) of an intra-frame coded picture is detected by the code pattern detecting means 903.

At this time, blank pictures (Bu pictures) are inserted following a bidirectional predictive coded picture B3 (B picture), resulting in blue-back processing which provides a screen turned to blue.

Then, when the code pattern detecting means 903 detects the start code (I picture) of the intra-frame coded picture from the coded picture data after the change, passing data through to the input buffer memory 902 is permitted again and the blue-back processing is canceled, whereby reproduction operation is started again.

The decoding apparatus is configured to prevent reference picture error caused by connecting data arrays of different types at the change of coded data and avoid decoding the data left in the buffer at the change of the coded picture data, by performing the above-described processing.

The prior art digital motion picture decoding apparatus and the digital motion picture decoding method have the above-described construction which prevents reference picture error caused by connecting different types of data arrays at the change of coded data, but both the conventional decoding apparatus and the method have a problem that when the coded data is changed due to the change of program or other causes, blue-back screen is maintained during a prescribed period of time, making a viewer feel unconformable.

Moreover, in the case that change of coded data is not performed on a single piece of picture data basis and the coded data to be input is changed in the process of decoding a single piece of picture data by means of the decoding means 905, the operation of changing program in the middle of decoding processing as shown in FIG. 8(*a*) allows a situation as shown in FIG. 8(*b*) which is equal to the situation caused by inputting a data array to which a different type of data array is connected, resulting in decoding error and the considerably confused display resulted from error picture.

Furthermore, as shown in FIG. 5, since the structure of the data coded by a method employing bidirectional coding such as MPEG coding has an order different from both the order in which the picture data of the coded data is placed and the display order for reproducing pictures, forward predictive coded picture (P pictures), which is to be displayed following a sequence of bidirectional predictive coded pictures (B pictures), is decoded before decoding of the bidirectional predictive coded pictures (B pictures), and the resultant decoded data is stored in the reproduced picture memory 907. Therefore, as shown in FIG. 6), in the configuration only capable of clearing the data in the input buffer memory at the last stage, when the decoding processing has been already completed at the change of the coded picture data to be input and reproduced picture data which is not displayed yet (P6) is stored in the reproduced picture memory because the display time is not reached, that reproduced picture data is certainly displayed when the display time based on time information of the reproduced picture is reached. Therefore, with a long interval between each display time of reproduced pictures, an extended period of time is required before displaying the reproduced picture data which is unnecessary (P6) and it takes much time to change the coded picture data in the process of reproduction, whereby the blue-back screen is displayed for an extended period of time and makes a viewer feel uncomfortable.

SUMMERY OF THE INVENTION

An object of the invention is to provide a digital motion picture decoding apparatus and a digital motion picture decoding method which do not display blue-back screen during change of coded data due to change of program or the like, in order to prevent a viewer from feeling uncomfortable.

A further object of the invention is to provide a digital motion picture decoding apparatus and a digital motion picture decoding method which do not cause decoding error even when coded data is not changed on a single piece of picture data basis and the coded data to be input is changed when a single piece of picture data is being subjected to decoding processing.

A still further object of the invention is to provide a digital motion picture decoding apparatus and a digital motion picture decoding method which require a short time before displaying the reproduced picture data which is unnecessary and do not take much time to change the coded picture data in the process of reproduction, in the case that one piece of picture data, whose display time established according to time information on a display picture basis is not reached, has been already decoded at the change of coded picture data, and the reproduced picture is stored in the reproduced picture memory.

Other objects and advantages of the invention will become apparent from the detailed description that follows. The detailed description and specific embodiments described are provided only for illustration since various additions and modifications within the scope of the invention will be apparent to those of skill in the art from the detailed description.

According to a first aspect of the present invention, a digital motion picture decoding apparatus comprising an input buffer memory for storing coded data to be decoded, a reproduced picture memory for storing the decoded picture data to be displayed, and a display picture deciding means for deciding from the picture data stored in the reproduced picture memory a reproduced picture to be output, further comprises: a program changing means for changing the type of the coded data to be decoded; a program change detecting means for detecting from the output of the program changing means that the type of the coded data to be decoded is changed; and a display state maintaining means for controlling the picture data output from the reproduced picture memory so as to maintain the display state of the reproduced picture being currently displayed according to the decision of the display picture deciding means, when it is detected from the output of the program change detecting means that the change of the type of the coded data to be decoded makes the coded data not continuous in time sequence.

According to a second aspect of the present invention, in the digital motion picture decoding apparatus defined in the first aspect, the program change detecting means detects from an output of the program changing means a difference between a normal reproduction state and a reproduction state after change of program or a reproduction state at a reproduction rate different from the normal reproduction rate.

According to a third aspect of the present invention, the digital motion picture decoding apparatus defined in the first aspect further comprises an input buffer memory erasing means for erasing the coded data to be decoded which is stored therein, when the program change detecting means detects that the data subjected to decoding is not continuous in time sequence.

According to a fourth aspect of the present invention, a digital motion picture decoding apparatus comprising an input buffer memory for storing coded data to be decoded, a reproduced picture memory for storing decoded picture data to be displayed, and a display picture deciding means for deciding from the picture data stored in the reproduced picture memory a reproduced picture to be output, further comprises: a program changing means for changing the type of the coded data to be decoded; a program change detecting means for detecting from the output of the program changing means that the type of the coded data to be decoded is changed; a reproduced picture memory nullifying means for nullifying the data stored in the reproduced picture memory other than the data corresponding to the reproduced picture being currently displayed, when it is detected from the output of the program change detecting means that the change of the type of the coded data to be decoded makes the coded data not continuous in time sequence.

According to a fifth aspect of the present invention, the digital motion picture decoding apparatus defined in the fourth aspect comprises a reproduced picture area managing means for managing memory area information used when the decoding means writes the decoded picture data into the reproduced picture memory, and in this apparatus, the reproduced picture memory nullifying means erases the memory area information corresponding to the data stored in the reproduced picture area managing means except the data corresponding to a reproduced picture being currently displayed.

According to a sixth aspect of the present invention, in the digital motion picture decoding apparatus defined in the fourth aspect, the reproduced picture memory nullifying means erases the data in the reproduced picture memory except the data corresponding to the reproduced picture being currently displayed.

According to a seventh aspect of the present invention, in the digital motion picture decoding apparatus defined in the fourth aspect, picture data to be decoded next is written into a nullified memory area of the reproduced picture memory.

According to an eighth aspect of the present invention, a digital motion picture decoding apparatus comprising an input buffer memory for storing coded data to be decoded, a reproduced picture memory for storing decoded picture data to be displayed, and a display picture deciding means for deciding from the picture data stored in the reproduced picture memory a display picture to be output, further comprises: a program changing means for changing the type of the coded data to be decoded; a program change detecting means for detecting from the output of the program changing means that the type of the coded data to be decoded is changed; and a decoding stopping means for stopping decoding processing by the decoding means and controlling the decoding means such that the data being in the process of decoding at that time is written into the reproduced picture memory as the already decoded one, when it is detected from the output of the program change detecting means that the change of the type of the coded data to be decoded makes the coded data not continuous in time sequence.

According to a ninth aspect of the present invention, a digital motion picture decoding method comprises the steps of: detecting whether data is continuous in time sequence during decoding processing; and maintaining the display state of a reproduced picture being currently displayed when it is found in the first step that the data is not continuous in time sequence during the decoding processing.

According to a tenth aspect of the present invention, a digital motion picture decoding method comprises the steps of: detecting whether data is continuous in time sequence during decoding processing; and nullifying data other than the one corresponding to a reproduced picture being currently displayed, when it is judged in the first step that the data is not continuous in time sequence during the decoding processing.

According to an eleventh aspect of the present invention, the digital motion picture decoding method defined in the tenth aspect further comprises a step of stopping decoding processing and processing the data being currently decoded at that time as the already decoded one, when it is judged in the first step that the data is not continuous in time sequence during the decoding processing.

BRIEF DESCRIPTION OF THE DRAWINGS

FIG. 1 is a block diagram of a digital motion picture decoding apparatus according to an embodiment of the present invention.

FIG. 2 is a flow chart for explaining the operation during change of program by the digital motion picture decoding apparatus of the embodiment of the invention.

FIG. 3 is a flow chart for explaining the operation of the decoding means during change of program in the digital motion picture decoding apparatus of the embodiment of the invention.

FIG. 7 is a diagram illustrating an exemplary operation of a digital motion picture decoding apparatus of the present invention under the condition illustrated in FIG. 5.

FIGS. 8(*a*) to 8(*c*) are diagrams showing the states of a decoding means in the case that coded data is changed in the middle of decoding one piece of picture data.

FIG. 9 is a block diagram of a prior art digital motion picture decoding apparatus.

FIG. 10 is a conceptual diagram of a state table of reproduced picture areas which constitute the digital motion picture decoding apparatus according to the embodiment of the present invention.

PREFERRED EMBODIMENT OF THE INVENTION

Figure 4:
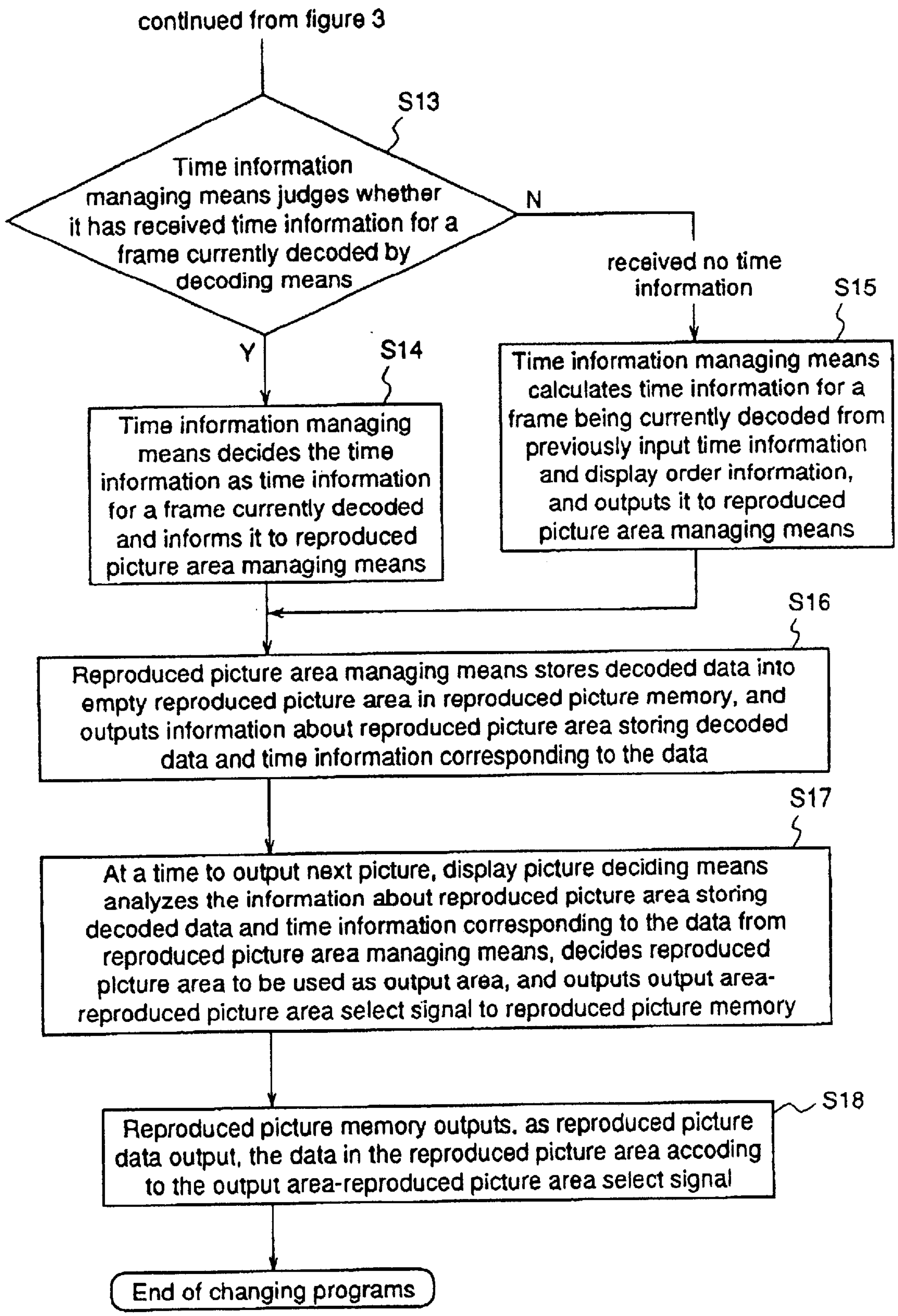
FIG. 4 is a flow chart for explaining the operation for displaying new coded data after change of program in the digital motion picture decoding apparatus of the embodiment of the invention.
Figure 5:
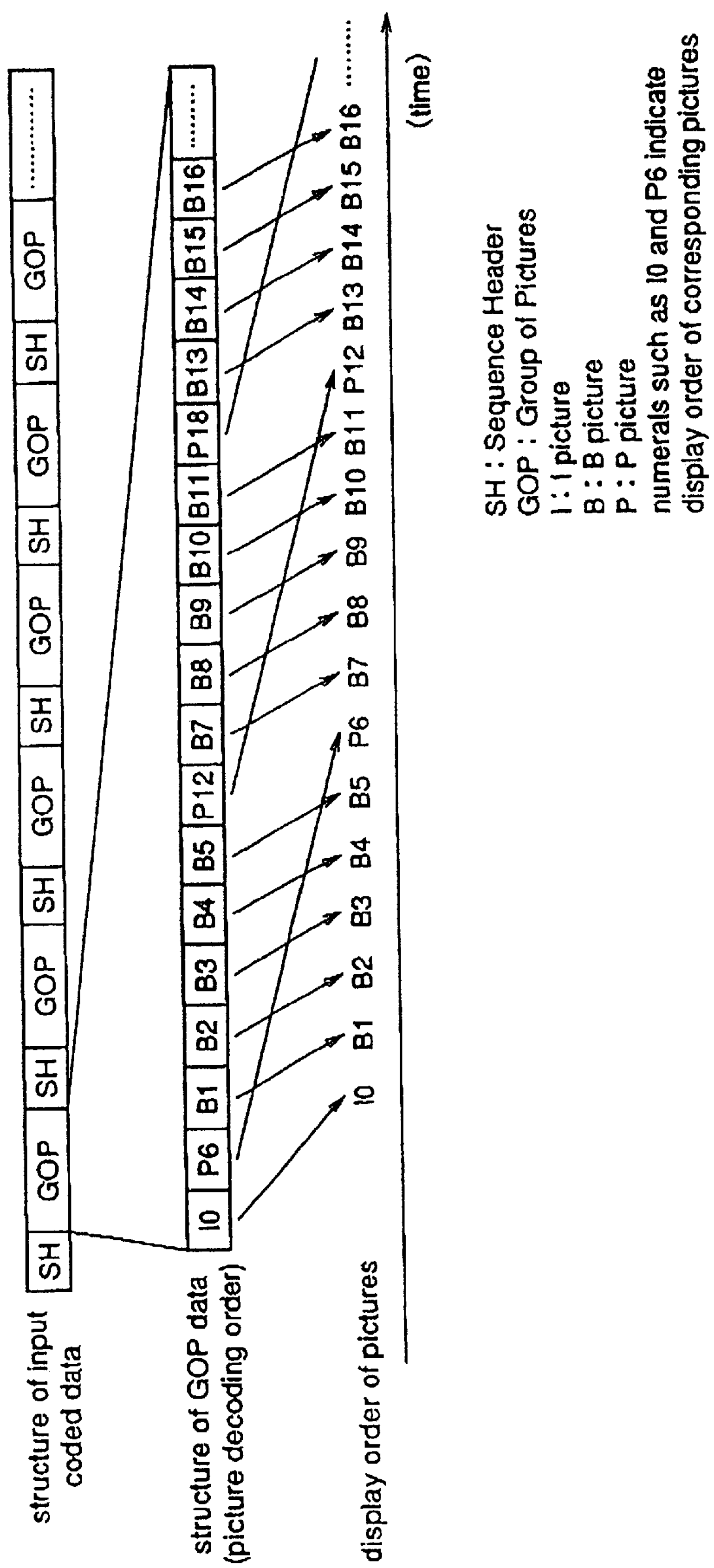
FIG. 5 is a diagram showing an example of the structure of a bit stream coded in a coding mode which uses a bidirectional predictive coding such as MPEG.

Hereinafter a description is given of a digital motion picture decoding apparatus and a digital motion picture decoding method according to the present invention with reference to drawings.

FIG. 1 is a block diagram of a digital motion picture decoding apparatus according to an embodiment of the invention. In the figure, reference numeral 100 designates a digital motion picture decoding apparatus of the invention, and numeral 104 designates a program change detecting means, which means takes coded video streams corresponding to a plurality of coded programs as inputs and, according to a program select signal input by a user through a control means (remote controller) 111, selects one bit stream corresponding to one of the plural programs to output it as coded picture data 101.

In normal decoding operation, the input coded picture data 101 is passed through a code pattern detecting means 103 which is described later, and stored in an input buffer memory 102.

The input buffer memory 102 has a relatively large capacity, for example, about 400 Kb, and outputs the stored coded data according to a request from a decoding means 105 which is also described later.

The decoding means 105 manages an amount of data in the input buffer memory 102 based on the amount of the data input into this means and the amount of the data output from the means, and controls the data input to the means itself according to the amount of the data stored in the input buffer memory 102. Moreover, the decoding means 105 also includes a reproduced picture memory address management table for managing null addresses when the decoded picture data is written into a reproduced picture memory 107 which is also described later.

The code pattern detecting means 103 is a block which inhibits data from passing through to the input buffer memory 102 until a predetermined code pattern is detected, according to a data passing inhibit signal from the program change detecting means 104, and this means normally allows data to passing through during reproduction.

The reproduced picture memory 107, which comprises SDRAM, for example, has a capacity for storing three frames of picture data (500 Kb×3=1.5 Mb) and includes divided regions M0 to M2. The coded picture data input to the decoding means 105 to be decoded is stored into one of the reproduced picture regions M0 to M3 in the reproduced picture memory 107, on one display picture basis.

The display picture deciding means 106 comprises a base time counter for counting up with time precision equal or superior to the time precision of the time information established on single frame picture basis by a time information managing means 108 which is described later, and this base time counter manages a base time for reproduction operation. Moreover, the base time counter can change its count according to the base time information signal input from the decoding means 105. Then, when it is judged from a comparison between the count of the base time counter and a value of the time information from the reproduced picture area managing means 109 which is described later that these values are equal or approximately equal, this means decides a reproduced picture area as an output area according to the data storage information from the reproduced picture area managing means 109. Then, to output the decoded data in this area, the deciding means outputs a signal for selecting a reproduced picture area from which decoded data is to be output (this signal is hereinafter referred to as an output area-reproduced picture area select signal), to the reproduced picture memory 107 and the reproduced picture area managing means 109.

Reference numeral 109 designates the reproduced picture area managing means, and this managing means relates the information indicating which reproduced picture area of the reproduced picture memory 107 stores the decoded picture data, to a display state flag fed back from the display picture deciding means 106 which is described later, and performs management using a table as shown in FIG. 10, for example.

Further in the above configuration, the control means (remote controller) 111 implements a program changing means, and the program change detecting means 104 implements a program change detecting means for detecting change of program according to a program select signal input from the control means (remote controller) 111, and an input buffer memory erasing means for erasing the data stored in the input buffer memory 102. The display picture deciding means 106 and the reproduced picture area managing means 109 implement a display state maintaining means and the program change detecting means 104 and the reproduced picture area managing means 109 implement a reproduced picture memory nullifying means and a decoding stopping means.

FIGS. 2 and 4 are flow charts illustrating the processes performed by the digital motion picture decoding apparatus, and the operation will be described with reference to these flow charts.

Before the description, it is assumed that among the picture data stored in the reproduced picture memory 107, a piece of picture data stored in reproduced picture area M1 is currently reproduced corresponding to a specified program selected by user input.

Next, a description is given of the operation performed in the case that data array subjected to decoding processing becomes non-continuous at some midpoint because coded data is changed during the reproduction, with reference to the block diagram of FIG. 1 and the flow chart of FIG. 2.

Program change processing in the middle of reproduction starts as follows; in step S1, the control means (remote controller) 111 changes a program desired to be reproduced in the process of reproduction and outputs to the program change detecting means 104 a program select signal for changing coded data to be reproduced.

Then, in step S2, the program change detecting means 104 outputs to the code pattern detecting means 103 a data passing inhibit signal for inhibiting coded data from passing through until a prescribed code is detected, and simultaneously outputs to the input buffer memory 102 a data clear signal for clearing all the data currently stored in this memory 102. Further, at the same time, this means also outputs to the decoding means 105 a decoding stop signal for stopping the currently performed decoding, and to the reproduced picture area managing means 109, a flag erase signal for clearing the data in the areas other than the area for a reproduced picture being currently displayed.

Thereafter, the program change detecting means 104 selects coded data of a program, from the stream data arrays of plural programs which have been input, according to the program select signal from the control means (remote controller) 111, and starts outputting the coded data to the code pattern detecting means 103.

In response to the input of the data passing inhibit signal, the code pattern detecting means 103 inhibits the input coded data from passing through to the input buffer memory 102 and waits for the input of a sequence header code of the coded data based on MPEG.

Further, the input buffer memory 102 clears all the stored data in response to the input data clear signal and waits the data input from the code pattern detecting means 103.

Furthermore, the decoding means 105 stops the currently performed decoding processing in response to the input of the decoding stopping signal and waits for the input of a sequence header code. Thereafter, this means outputs a data request signal requesting new coded data to the input buffer memory 102.

In step S3, when data is input, it is checked whether the data is a sequence header code or not. The data which is not the sequence header code is discarded, and a check is made for next input data to see whether the data is a sequence header code or not. The process in step S3 is repeated until a sequence header code is input.

As described above, in the digital motion picture decoding apparatus of the conventional configuration, by stopping the decoding processing immediately after change of program, a state is brought about which is equal to the state that different types of data arrays connected to each other are input to the decoding means. This results in decoding error, and considerably confused display caused by displaying error pictures, which makes viewer feel uncomfortable.

Further, the reproduced picture area managing means 109 clears the data in the reproduced picture memory 107 except the data in the area for the reproduced picture being currently used as a display output, by means of a flag erase signal. More specifically, flags are changed so that the data storage information about the reproduced picture memory 107 indicates "no data" except the one about the reproduced picture area M1. This process resolves one of the problems occurred in the digital motion picture decoding apparatus of the conventional configuration that displaying unnecessary reproduced picture data prolongs a time interval between change of the coded picture data to be input and change of reproduced pictures.

Furthermore, data storage information and a time information notifying signal are output to the display picture deciding means 106, the information and the signal both being the contents of the reproduced picture area state table changed to the state after data clear immediately after clearing the data in the reproduced picture memory 107.

Figure 6:
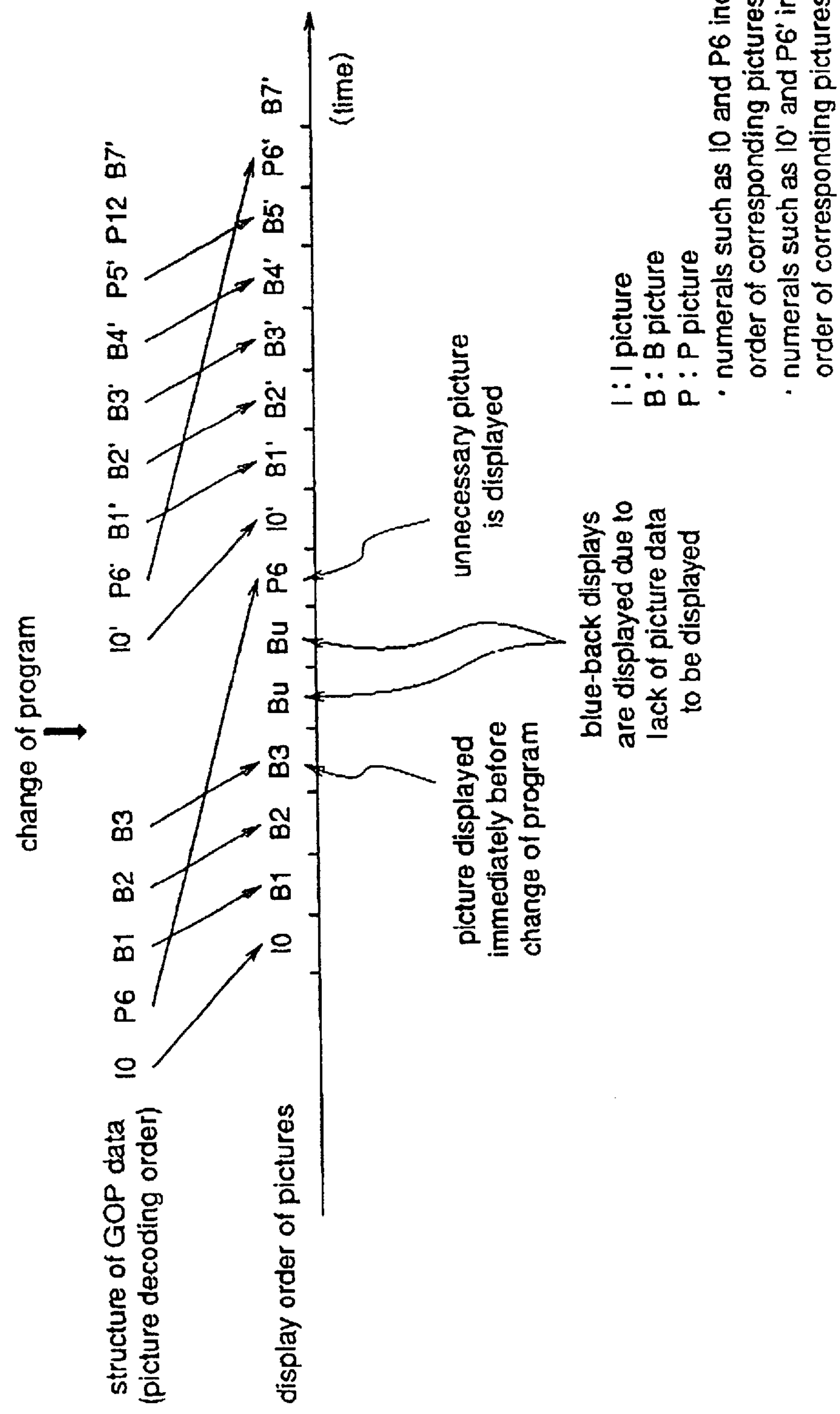
FIG. 6 is a diagram showing an example of the structure of a bit stream and an exemplary operation of the conventional digital motion picture decoding apparatus, in the case that coded data to be input is changed in the process of reproduction.

According to the data storage information and the time information notifying signal from the reproduced picture area managing means 109, the display picture deciding means 106 detects that there is no data in reproduced picture areas except the one being currently used as an output area for display, and outputs to the reproduced picture memory 107 an output area-reproduced picture select signal which instructs to output the data from this reproduced picture area repeatedly because the reproduced picture areas other than that area contains no data This process resolves one of the problems for the digital motion picture decoding apparatus of the conventional configuration that blue-back display processing (see Bu in FIG. 6) performed until the display of a new picture after the change (see IO' in FIG. 6) causes a display state transition which is considerably clumsy.

Next, a description is given of the operation in the process of displaying new coded data obtained after change of program.

In step S3, the code pattern detecting means 103 analyzes new coded data obtained from the program change detecting means 104 to detect a sequence header code and, when the sequence head code is detected, the step is followed by step S4 in which passing coded data through to the input buffer memory 102 is permitted again.

This step is followed by step S5, in which storing coded data into the input buffer memory 102 is resumed with the data following the sequence header code being initial one, and outputting the data is started corresponding to the data request signal from the decoding means 105.

In step S6, from the coded data which includes display order information for single frame picture being currently decoded and the time information about the times at which the picture should be displayed, the decoding means 105 extracts the above information to output it as an extracted information signal to the time information managing means 108. If the coded data contains no time information based on which a single frame pictures being currently decoded is displayed, the display order information only is output to the time information managing means 108 as an extracted information signal. Moreover, the decoding means 105 extracts the base time information contained in the coded data and outputs it as a base time information signal to the display picture deciding means 106.

Following this, the same operation as in normal reproduction is performed: as shown in the flow chart of FIG. 3, in step S7, the decoding means 105 judges whether the input coded data is predictive coded data or not; when the coded data is a predictive coded one, this step is followed by step S8 wherein a reference picture data request signal is output to the reproduced picture area managing means 109 to request necessary data. If the input coded data is not a predictive coded one, decoding processing is performed using the input coded data only.

Then, in step S9, the reproduced picture area managing means 109 checks which reproduced picture area of the reproduced picture memory 107 stores the requested reference picture data, and in step S10, the reproduced picture area managing means 109 outputs a reference picture data output control signal which instructs to output the data in the specified area as reference picture data.

In step S11, the reproduced picture memory 107 outputs the data in the specified area as reference picture data, according to the instruction of the reference picture data output control signal.

Then, in step S12, the decoding means 105 starts decoding the predictive coding type coded data using the input reference picture data.

In step S12-1, the decoding means 105 outputs decoded data obtained by the decoding processing to the reproduced picture memory 107 The reproduced picture area managing means 109 outputs to the reproduced picture memory 107 an address signal which instructs the area in which that decoded data is to be stored.

If the coded data in the process of decoding contains base time information, the information is output to the display picture deciding means 106 as base time information.

Further, the display order information for displaying a single frame picture being in the process of decoding and the time information based on which such picture is displayed are extracted from the coded data and output as an extracted information signal to the time information managing means 108. If the above-described time information is not included in the coded data, the display order information only is extracted and output as an extracted information signal to the time information managing means 108.

Next, the time information managing means 108 judges whether the time information extracted from the coded data is included in an extracted information signal which is input, and when the time information is included, this time information is determined as the time information based on which the picture is to be displayed, which picture is currently being decoded in the decoding means 105, and output as a time information signal to the reproduced picture area managing means 109. If the time information is not found, time information based on which the single frame picture being currently decoded is to be displayed is calculated from time information and display order information for another single frame picture, both previously input from the decoding means 105, and the display order information for the single frame picture being currently decoded, outputting it as a time information signal to the reproduced picture area managing means 109.

Next, in step S16, the reproduced picture area managing means 109 checks the contents of the reproduced picture area state table, outputting new decoded data obtained from the decoding means 105 after the change of program to the reproduced picture areas other than the reproduced picture area from which the display is being output (ml), that is, M0 and M2, and from these areas the decoded data has been cleared. The reproduced picture area managing means 109 also changes the contents of the reproduced picture area state table, outputting data storage information and a time information notifying signal to the display picture deciding means 106.

Then, in step S17, the display picture deciding means 106 detects from the data storage information and the time information notifying signal the fact that new picture is ready to be output, outputting an output area-reproduced picture area select signal such that the decoded data of the picture stored in one of the reproduced picture areas will be output when the time based on the time information for the picture is reached.

Following this step, in step S18, the reproduced picture memory 107 outputs new decoded data obtained after the change of program as reproduced picture data, according to the output area-reproduced picture area select signal.

The above-described processes enable to change a picture to be displayed, according to the content of a newly selected program.

As described above, in the first embodiment, passing data through to the input buffer memory 102 is inhibited when change of program is detected, and simultaneously all the data in the input buffer memory 102 is erased while the display picture deciding means 106 is controlled to maintain the display picture at this time. This disables an unnatural screen such as a blue-back screen to be displayed for a certain period of time during the change of program, reducing viewer's uncomfortableness.

Further, when the change of program is detected, the information about the areas in the reproduced picture memory 107 other than that currently used as an output area for display is cleared to treat them as null areas, whereby the display of the unnecessary picture is prevented which will be displayed after the change of coded data. Further, since the coded data obtained after the change is written into the reproduced picture memory 107 more swiftly, it is possible to reduce a time necessary to perform the process until the reproduced picture of the coded data after the change is displayed.

In addition, since the decoding processing performed by the decoding means 105 is stopped and a code indicating that decoding a single piece of picture data is completed is added to the picture data being currently decoded, the data array of a different program is confused with the continuous data array being in the process of decoding, thereby preventing the occurrence of decoding error due to this misconception and the resultant display of error pictures.

Although in the first embodiment the code pattern detecting means 103 and the decoding means 105 have a feature of waiting for a sequence header code to be detected after the change of program, any detection feature is applicable as long as it can detect a code pattern indicating a head of a data unit for decoding processing and this detecting target is not limited to a sequence header code. Other code patterns such as an MPEG-based GOP header code and a start code of an intra-frame coded picture (I picture) can be used as long as those codes are code patterns which allow to reproduce picture only from the coded data following the detected data only.

Although this embodiment is configured such that the code pattern detecting means 103 is placed as a stage followed by the input buffer memory, the same operation can be obtained by the following configuration that the code pattern detecting means 103 is placed as a stage following the input buffer memory 102, and the buffer memory 102 outputs data according to the request for data from the code pattern detecting means 103 and inhibits the data to be sent to the subsequent decoding means 105 until the detecting means 103 detects a predetermined code pattern.

Although in this embodiment it is assumed that the reproduced picture memory 107 has three reproduced picture areas, the number of the reproduced picture areas is not limited to three and any number of reproduced picture areas are applicable as long as the number allows the decoded reproduced picture data to be displayed in a display order.

In addition, although in this embodiment the reproduced picture areas in the reproduced picture memory 107 are illustrated as contiguous areas, the structure of the reproduced picture memory 107 is not limited to this illustration and a reproduced picture memory can be employed which divides decoded data of each single picture data into non-contiguous areas for storage.

Although in this embodiment a decoding object is MPEG-based coded data, the coded data as a decoding object is not limited to this data coded based on MPEG, and any coded data is applicable as long as this code is the one coded by bidirectional predictive coding and therefore the data coded by any coding method other than MPEG-based coding may be used.

The stream data input to the program change detecting means 104 is not necessary to be broadcasted and such configuration is applicable in which required program stream data is read from record media such as disks.

Although in this embodiment the count of the base time counter is changed according to base time information whenever that base time information is input to the display picture deciding means 106, this change may be performed only when the base time information corresponding to the initial part of each coded data to be reproduced is input to the display picture deciding means 106, or this change may be performed at arbitrary timing corresponding to the input of a control signal from external unit.

Furthermore, in this embodiment, it is not necessary for the base time information to be changed according to the data extracted from the coded data by the decoding means 105 and external unit may directly set the count of the base time counter to an arbitrary value.

What is claimed is:

1. A digital motion picture decoding method comprising the steps of:

decoding a coded data stream as a reproduction picture;

receiving a manually inputted signal which causes only one discontinuity in time sequence of a coded data stream to be decoded;

nullifying decoded data, including decoded data which has not been displayed, corresponding to coded data read prior to the occurrence of the discontinuity; and maintaining a currently displayed frame until a frame from coded data read after the discontinuity lapses is decoded and ready to be displayed.

2. The digital motion picture decoding method of claim 1, further comprising the step of:

decoding a coded data stream, read after the discontinuity lapses, as a reproduction picture.

3. The digital motion picture decoding method of claim 1, further comprising the steps of:

stopping decoding a coded data stream, read prior to the occurrence of the discontinuity; and nullifying coded data, read prior to the occurrence of the discontinuity.

4. The digital motion picture decoding method of claim 1, wherein the coded data stream includes predictive coded data.

5. The digital motion picture decoding method of claim 4, wherein the coded data stream includes bidirectional predictive coded data.

6. The digital motion picture decoding method of claim 5, wherein the coded data stream is coded by an MPEG coding method.

7. The digital motion picture decoding method of claim 1, wherein the manually inputted signal is received from a remote control.

8. A digital motion picture decoding apparatus, comprising:

a decoder for decoding a coded data stream as a reproduction picture; and a controller for receiving a manually inputted signal which causes only one discontinuity in time sequence of a coded data stream to be decoded, wherein said controller operates to nullify decoded data, including decoded data which has not been displayed, corresponding to coded data read prior to the occurrence of the discontinuity and to maintain a currently displayed frame until a frame from coded data read after the discontinuity lapses is decoded and ready to be displayed.

9. The digital motion picture decoding apparatus of claim 8, wherein the controller operates so that the decoder decodes a coded data stream, read after the discontinuity lapses, as a reproduction picture.

10. The digital motion picture decoding apparatus of claim 8, wherein the controller operates so that the decoder stops decoding a coded data stream, read prior to the occurrence of the discontinuity, wherein the controller further operates to nullify coded data, read prior to the occurrence of the discontinuity.

11. The digital motion picture decoding apparatus of claim 8, wherein the coded data stream includes predictive coded data.

12. The digital motion picture decoding apparatus of claim 11, wherein the coded data stream includes bidirectional predictive coded data.

13. The digital motion picture decoding apparatus of claim 12, wherein the coded data stream is coded by an MPEG coding method.

14. The digital motion picture decoding apparatus of claim 8, wherein the manually inputted signal is received from a remote control.

* * * * *